US012698428B2

(12) United States Patent
Buechner et al.

(10) Patent No.: US 12,698,428 B2
(45) Date of Patent: Aug. 4, 2026

(54) LATENT REACTIVE ADHESIVE PREPARATIONS

(71) Applicant: Covestro Deutschland AG, Leverkusen (DE)

(72) Inventors: Joerg Buechner, Bergisch Gladbach (DE); Hans-Josef Laas, Odenthal (DE); Harald Kraus, Leverkusen (DE); Martin Melchiors, Leichlingen (DE)

(73) Assignee: Covestro Deutschland AG, Leverkusen (DE)

(*) Notice: Subject to any disclaimer, the term of this patent is extended or adjusted under 35 U.S.C. 154(b) by 1319 days.

(21) Appl. No.: 17/603,392

(22) PCT Filed: Apr. 17, 2020

(86) PCT No.: PCT/EP2020/060803
§ 371 (c)(1),
(2) Date: Oct. 13, 2021

(87) PCT Pub. No.: WO2020/216680
PCT Pub. Date: Oct. 29, 2020

(65) Prior Publication Data
US 2022/0177751 A1    Jun. 9, 2022

(30) Foreign Application Priority Data
Apr. 24, 2019    (EP) ..................................... 19170799

(51) Int. Cl.
*C09J 175/04*    (2006.01)
*C08G 18/08*    (2006.01)
*C08G 18/28*    (2006.01)
*C08G 18/40*    (2006.01)

(52) U.S. Cl.
CPC ........ *C09J 175/04* (2013.01); *C08G 18/0866* (2013.01); *C08G 18/2865* (2013.01); *C08G 18/409* (2013.01); *C08G 2115/06* (2021.01)

(58) Field of Classification Search
CPC ...... C09J 175/00; C09J 175/02; C09J 175/04; C09J 175/06; C09J 175/08; C09J 175/10; C09J 175/12; C09J 175/14; C09J 175/16; C09D 175/00; C09D 175/02; C09D 175/04; C09D 175/06; C09D 175/08; C09D 175/10; C09D 175/12; C09D 175/14; C09D 175/16
See application file for complete search history.

(56) References Cited

U.S. PATENT DOCUMENTS

| | | | |
|---|---|---|---|
| 2,840,589 A | 6/1958 | Smeltz |
| 2,853,473 A | 9/1958 | Campbell et al. |
| 2,853,518 A | 9/1958 | Balon |
| 2,941,966 A | 6/1960 | Campbell |
| 4,248,978 A | 2/1981 | de Cleur et al. |
| 4,663,377 A | 5/1987 | Hombach et al. |
| 4,857,565 A | 8/1989 | Henning et al. |
| 4,910,339 A | 3/1990 | Henning et al. |
| 5,126,170 A | 6/1992 | Zwiener et al. |
| 6,111,017 A | 8/2000 | Imashiro et al. |
| 6,593,435 B2 | 7/2003 | Abend |
| 7,498,380 B2 | 3/2009 | Ganster et al. |
| 8,399,574 B2 | 3/2013 | Fujibayashi et al. |
| 8,802,704 B2 | 8/2014 | Quattropani et al. |
| 9,353,221 B2 | 5/2016 | Avtomonov et al. |
| 9,957,394 B2 | 5/2018 | Zhou et al. |
| 2007/0066786 A1 | 3/2007 | Hanson et al. |
| 2008/0171208 A1 | 7/2008 | Buchner et al. |
| 2012/0123052 A1 | 5/2012 | Laufer et al. |
| 2016/0115349 A1 | 4/2016 | Dong et al. |
| 2018/0066143 A1 | 3/2018 | Zhou et al. |

FOREIGN PATENT DOCUMENTS

| | | |
|---|---|---|
| DE | 1130594 B | 5/1962 |
| DE | 19701835 A1 | 7/1998 |
| EP | 0767188 A1 | 4/1997 |
| EP | 1247825 B1 | 2/2007 |
| EP | 2186841 A1 | 5/2010 |
| JP | 827092 A | 1/1996 |
| JP | 1160947 A | 3/1999 |
| JP | 20007642 A | 1/2000 |
| JP | 200677110 A | 3/2006 |
| JP | 2009525380 A | 7/2009 |
| JP | 201282421 A | 4/2012 |
| JP | 2013523928 A | 6/2013 |
| JP | 201641637 A | 3/2016 |
| WO | 2007089142 A1 | 8/2007 |

(Continued)

OTHER PUBLICATIONS

JP2000007642 machine translation (Year: 2024).*
International Search Report, PCT/EP2020/060803, date of mailing: Jun. 24, 2020, Authorized officer: Florian Paulus.
Adam, N. et al., "Polyurethanes", Ullmann's Encyclopedia of Industrial Chemistry, Electronic Release, 7th ed., chap. 3.2-3.4, Wiley-VCH, Weinheim 2005.
Chemical Reviews, vol. 57, No. 2, 1967, pp. 107-113
Laun, M. et al, "Guidelines for checking performance and verifying accuracy of rotational rheometers: viscosity measurements in steady and oscillatory shear", Pure Appl. Chem., 2014, 86(12), pp. 945-1968.

*Primary Examiner* — Jeffrey S Lenihan

(74) *Attorney, Agent, or Firm* — Donald R. Palladino

(57) ABSTRACT

The invention relates to the use of solid polycarbodiimide resins having a softening temperature of >+30° C. as cross-linking agents for adhesive dispersions polymers. The mixtures from at least one solid polycarbodiimide resin and at least one polymer dispersion are suitable for producing storage stable latent-reactive adhesive dispersions, latent-reactive adhesive layers, self-supporting latent reactive adhesive films or latent-reactive adhesive powders.

14 Claims, 2 Drawing Sheets

(56) References Cited

FOREIGN PATENT DOCUMENTS

| WO | 2017006950 | A1 | 1/2017 |
| WO | 2018136488 | A1 | 7/2018 |

* cited by examiner

LATENT REACTIVE ADHESIVE PREPARATIONS

CROSS-REFERENCE TO RELATED APPLICATIONS

This application is a national stage application under 35 U.S.C. 371 of PCT/EP2020/060803, filed Apr. 17, 2020, which claims the benefit of European application no. 19170799.1, filed Apr. 24, 2019, each of which is incorporated herein by reference.

FIELD OF THE INVENTION

The present invention relates to latently reactive adhesive preparations that comprise solid polycarbodiimide resins having a softening temperature of above +30° C. as crosslinking agents for adhesive dispersion polymers. Mixtures of at least one solid polycarbodiimide resin and at least one polymer dispersion are themselves already storage-stable and are suitable for the production of storage-stable latently reactive adhesive dispersions, latently reactive adhesive layers, self-supporting latently reactive adhesive films or latently reactive adhesive powders. These mixtures can also themselves be used as storage-stable latently reactive adhesives, optionally with the addition of additives customary for adhesive dispersions in adhesives technology, such as catalysts, defoamers, wetting agents, thickeners, microbicides/biocides, dyes, pigments, viscosity regulators, and the like. Suitable polycarbodiimides must therefore have an average minimum functionality of 2, that is to say have an average of at least 2 carbodiimide groups per molecule.

BACKGROUND

Polycarbodiimides are known. EP-A 2 552 982 (WO 2011/120928) discloses a method for preparing hydrophilically modified polycarbodiimides from aliphatic or cycloaliphatic diisocyanates, in which the carbon dioxide gas evolved during the carbodiimidization reaction is removed from the reaction mixture periodically (i.e. from time to time) or continuously. The advantage of this methodology is the small amount of catalyst needed for the carbodiimidization. The polycarbodiimide resin is at 23° C. a highly viscous mass. The hydrophilically modified polycarbodiimide resin thus obtained is dispersed in water.

Such polycarbodiimide dispersions are used inter alia as crosslinking agents for aqueous adhesives, coating agents or paints. However, a disadvantage of this teaching is that the crosslinking reaction in the adhesive/coating lacquer layer begins as soon as the aqueous coating has dried and then proceeds with great rapidity.

The storage-stable precoating of substrate surfaces, self-supporting latently reactive adhesive films or reactive adhesive powders is therefore not in principle possible with this type of crosslinking agent.

In the manufacturing industry, there is however a pressing need for spatial and temporal separation between application of the adhesive and the joining process. If, for example, (partially) crystalline polyurethane dispersion polymers are used for the joining process, it is advantageous when the crosslinking reaction of the adhesive polymer is initiated only by the heating of the adhesive layer that is necessary before or during the joining process. Those skilled in the art of this technical field understand "dispersion polymers" as meaning those polymers that can be used in a fundamentally known manner as a dispersed phase in aqueous dispersions.

These dispersion polymers are also referred to as "dispersible polymers". In a dispersion polymer, the polymer in the polymer particles (disperse phase) is accordingly in a colloidally stable polymer dispersion. In the case of polyurethane dispersions, the continuous phase is usually water. A polymer dispersion thus consists of at least one disperse phase (polymer particles) and one continuous phase (the dispersion medium). In the case of the polyurethane dispersions used according to the invention, the dispersion medium is water.

When the polymer dispersion is applied to a substrate and the dispersion medium evaporated, the dispersion polymer gives rise to a polymer film, provided the temperature of the polymer is above the minimum film-forming temperature (MFT). The polymer film comprises all constituents of the polymer dispersion that are non-volatile at the drying temperature.

Latently reactive preparations of dispersion polymers that comprise solid isocyanates as crosslinking agents or which are mixed with such solid isocyanates and applied as the disperse phase of a dispersion on substrates are known.

EP-A 0 922 720 discloses the use of at least one essentially aqueous dispersion that comprises at least one solid, surface-deactivated polyisocyanate and at least one isocyanate-reactive polymer, for the production of dried, storage-stable, latently reactive layers or powders.

DETAILED DESCRIPTION OF THE INVENTION

Figure 1:
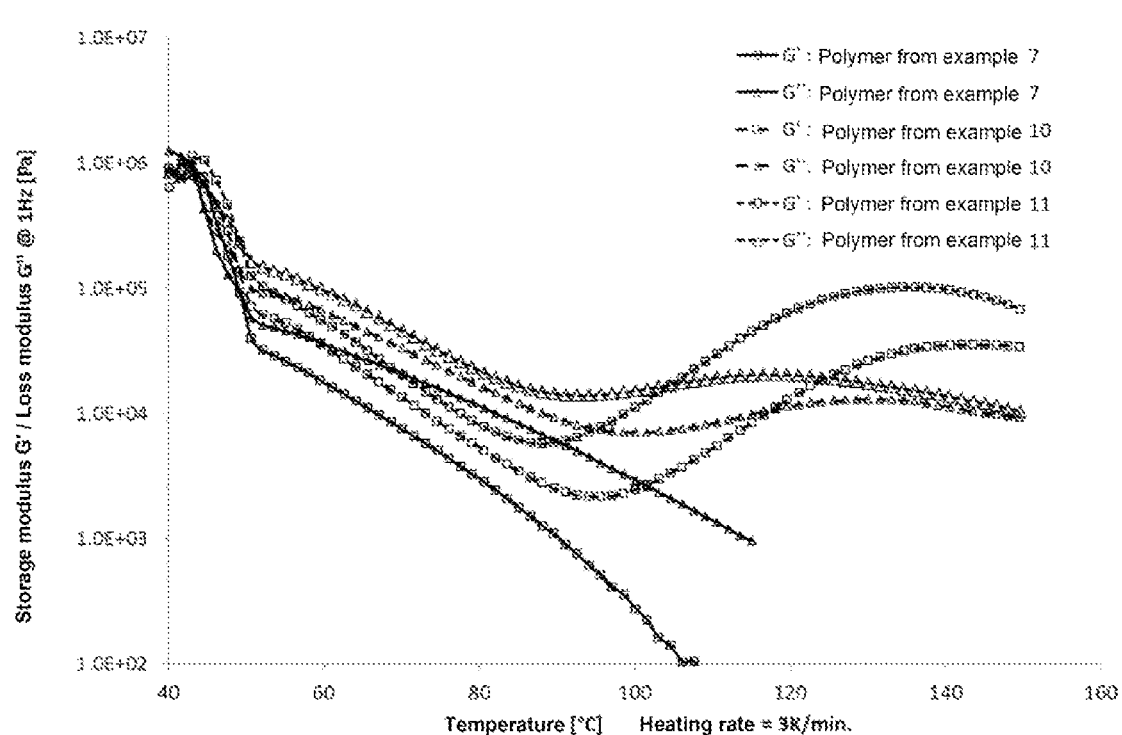
FIG. 1 is a graph showing the storage modulus and loss modulus over a temperature range for polymers described in examples 7, 10 and 11.

In principle, all solid isocyanates can according to this teaching be used. However, it has been shown that when (partially) crystalline polyurethane dispersion polymers are used, two solid isocyanates can be used by preference: TDI dimer and IPDI trimer. Both isocyanates are readily soluble in the molten polyurethane dispersion polymers and are well compatible with them, which is advantageously necessary for uniform and good crosslinking of the adhesive polymer.

However, both solid isocyanates have drawbacks in some respects:

As soon as the TDI dimer dissolves in the molten polyurethane polymer, the TDI dimer begins to undergo retrocleavage to the TDI monomer (2,4-TDI). 2,4-TDI is highly volatile and can be released from the adhesive layer, for example through porous substrates (textile), into the gas space above the adhesive bond. 2,4-TDI is a hazardous substance that, according to GHS (Globally Harmonized System of Classification, Labelling and Packaging of Chemicals), must be labeled GHS06 on account of its acute toxicity and GHS08 on account of various health hazards.

According to the teaching of EP-A 1 600 485, the release of 2,4-TDI can be considerably reduced through the additional use of catalysts. However, it has been found that the release of 2,4-TDI cannot be reliably reduced to amounts below the detection limit. Consequently, latently reactive adhesive layers that comprise TDI dimer as solid isocyanate are not used in, for example, bonding processes for add-on components in automobile interiors (dashboard, door side panel).

A disadvantage of IPDI trimer is that its aqueous formulations have only limited storage stability. For example, the maximum storage time of aqueous formulations comprising IPDI trimer is only 1-2 months at 23° C., approx. 2 weeks at 30° C. and only approx. 1 week at 35° C. Moreover, IPDI trimer is considerably less reactive than TDI dimer and is therefore processed almost exclusively with the additional use of suitable catalysts (see EP-A 2 099 840 A1 and WO 2008/071307).

There is therefore a demand in the adhesive processing industry for new crosslinking agents that make it possible to provide storage-stable aqueous adhesive systems from which latently reactive adhesive layers, adhesive films or adhesive powders can be produced. The crosslinking agents should be physiologically harmless, should not decompose during processing of the adhesive polymer, and should have adequately high reactivity.

Polycarbodiimides that are solid at room temperature are known. These products are used as stabilizers/hydrolysis stabilizers for polymers containing ester groups, such as polyesters or thermoplastic polyurethanes. In addition, solid polycarbodiimides are also used as crosslinking components in powder coating formulations.

Carbodiimide-blocked isocyanate prepolymers have likewise been described. These products too may be solids having a softening temperature above +23° C.

EP-A 0 881 243 discloses the use of polycarbodiimide from aliphatic, araliphatic, and aromatic diisocyanates as a crosslinking agent for powder coatings. The polycarbodiimides have a melting temperature between 40° C. and 200° C. The degree of polymerization of the polycarbodiimides according to the invention is between 2 and 50 for a polycarbodiimide having terminal NCO groups, between 0 and 50 when monoisocyanates are additionally used for chain termination, and between 2 and 50 when the chain is terminated by alcohol, amine, carboxylic acid or carboxylic acid anhydride.

U.S. Pat. No. 8,399,574 describes the composition of a powder mixture for a slush molding process consisting of a thermoplastic polyurethane and a polycarbodiimide having a molecular weight between 10 000 and 30 000 g/mol. The polycarbodiimide is produced from tetramethylxylylene diisocyanate (TMXDI).

EP-A 0 767 188 describes crosslinking agents for polyurethane basecoats. The crosslinking agents are isocyanate prepolymers blocked with carbodiimide groups. The crosslinking agents have a melting temperature of ≥70° C.

EP-A 0 005 230 discloses binders for powder coatings, wherein the crosslinker component b), a blocked isocyanate, has a melting point between 60° C. and 180° C. Carbodiimide is likewise used as a blocking agent. The blocking reaction takes place by reaction of the carbodiimide segments formed as intermediates with free NCO groups to form uretonimine On heating the powder coating, the uretonimine undergoes retrocleavage to carbodiimide and isocyanate, with the liberated isocyanate crosslinking the powder coating polymer.

What this means is, that according to the teaching of EP-A 0 76 188 and EP-A 0 005 230, the crosslinking of the powder coating is due not to reaction of the carbodiimide segments with the reactive groups in the powder coating molecules, but to the NCO groups liberated at higher temperatures (through retrocleavage).

U.S. Pat. No. 9,957,394 (WO 2018/048709) describes a powder coating composition consisting of a polymer containing carboxyl groups that has a glass transition temperature of at least +50° C. and a polycarbodiimide that comprises urethane and/or urea segments. The polycarbodiimide likewise has a glass transition temperature of at least +50° C. This means that when the powder coating composition is applied to a substrate or a release film, no film formation occurs. The aqueous mixture of polymer and polycarbodiimide is dried and the powder obtained is adjusted to the desired particle size by grinding. Suitable for the production of the polycarbodiimide are 4,4'-diisocyanatodicyclohexyl-methane, isophorone diisocyanate, meta-tetramethylxylylene diisocyanate (TMXDI) or mixtures of these diisocyanates.

Chemically curing powder coatings consist of at least one film-former system (binder) and a crosslinker. Crosslinking must not occur to any discernible degree during processing of the premixed powder coating in the extruder. In addition, the ground powder coating must not sinter or block during storage. For this reason, only largely amorphous binders/film formers having a glass transition temperature of at least +40° C. are used for powder coatings (Industrielle Pulverbeschichtung [Industrial Powder Coating], Judith Pietschmann, ISBN 979-3-8348-0463-1).

The object of the present invention was to provide a new crosslinking agent for adhesive polymers that can be used in aqueous polymer dispersions and gives these preparations a long pot life and allows the production of latently reactive adhesive layers, latently reactive adhesive films, and latently reactive adhesive powders. The crosslinking agent should be physiologically harmless. The crosslinking reaction should be initiated by the action of heat on the adhesive polymer.

This object was achieved by the subject matter of the present invention.

The present invention consists inter alia in providing the teaching of the provision of preparations comprising finely particulate polymeric carbodiimides that have a softening temperature of at least +30° C., preferably at least +35° C., in a mix with finely particulate polymers that can be crosslinked with these polycarbodiimides, either (dry) as a powder mixture or (wet) as a dispersion, or by mixing and melting the powder as a then immediately reacting (in the sense of crosslinking of the polymer) mixture or by drying the dispersion in the form of a coating obtained as a latently reactive film on the substrate.

The present invention therefore also provides latently reactive, dispersion polymer-based preparations having a minimum film-forming temperature of ≤+23° C. and a glass transition temperature measured by DSC (heating rate 20 K/min) of ≤0° C. that can be crosslinked with carbodiimides and that comprise at least one polycarbodiimide having a glass transition temperature of at least +30° C. and an average functionality of at least 2.

In the preparations according to the invention, the crosslinking agents used for carbodiimide-reactive dispersion polymers are preferably any solid polycarbodiimide powders having a softening temperature of at least +30° C., preferably at least +35° C., Polycarbodiimide powders of this kind can be produced according to methods known per se, by grinding solid polycarbodiimide resins, for example with the aid of ball mills, bead mills, sand mills or jet mills, optionally at low temperature (cryogenic grinding). The particle size/particle size distribution of the polycarbodiimide powder can then be narrowed further by sieving or sifting. The size of the particles obtained can be determined for example by the method according to ISO 13320 (laser diffraction). Five individual measurements are performed and the arithmetic mean of the individual measurements is reported. The measuring device used can for example be a Malvern Mastersizer 3000.

Polycarbodiimide powders having an average particle size dv(50)≤70 μm, preferably dv(50)≤20 μm, and particularly preferably particles having dv(50)≤3.4 μm, are suitable. The particle size is determined according to ISO 13320 (laser diffraction) using a Malvern Mastersizer 3000 as the measuring device. Five individual measurements are performed and the arithmetic mean of the individual measurements is reported.

The polycarbodiimide resins used to produce the preparations according to the invention are any compounds containing at least two carbodiimide groups per molecule, such as those obtainable for example through the reaction of organic polyisocyanates, optionally with hydroxy- and/or amino-functional compounds, in the presence of a carbodiimidization catalyst and with elimination of carbon dioxide.

Isocyanates suitable for the production of the polycarbodiimide resins are any mono-, di-, and triisocyanates having aliphatically, cycloaliphatically, araliphatically, and/or aromatically attached isocyanate groups accessible in various ways, for example by phosgenation in the liquid or gas phase or by the phosgene-free route, for example by thermal urethane cleavage.

Preferred monoisocyanates are those in the 99 to 300 molecular weight range, for example n-butyl isocyanate, n-amyl isocyanate, n-hexyl isocyanate, n-heptyl isocyanate, n-octyl isocyanate, undecyl isocyanate, dodecyl isocyanate, tetradecyl isocyanate, cetyl isocyanate, stearyl isocyanate, cyclopentyl isocyanate, cyclohexyl isocyanate, 3- and 4-methylcyclohexyl isocyanate, benzyl isocyanate, phenyl isocyanate or naphthyl isocyanate.

Preferred diisocyanates are those in the 140 to 400 molecular weight range, for example 1,4-diisocyanatobutane, 1,5-diisocyanatopentane (pentamethylene diisocyanate, PDI), 1,6-diisocyanatohexane (hexamethylene diisocyanate, HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1,3-diisocyanato-2(4)-methylcyclohexane, 1-isocyanato-3,3,5-trimethyl-5-isocyanatomethylcyclohexane (isophorone diisocyanate, IPDI), 2,4'- and 4,4'-diisocyanatodicyclohexylmethane (H12-MDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bicyclohexyl, 4,4'-diisocyanato-3,3'-dimethyl-1,1'-bicyclohexyl, 4,4'-diisocyanato-2,2',5,5'-tetramethyl-1,1'-bicyclohexyl, 1,8-diisocyanato-p-menthane, 1,3-diisocyanatoadamantane, 1,3-dimethyl-5,7-diisocyanatoadamantane, 1-isocyanato-1-methyl-4(3)-isocyanatomethylcyclohexane, bis(isocyanatomethyl)norbornane, 1,3- and 1,4-bis(isocyanatomethyl)benzene (xylylene diisocyanate, XDI), 1,3- and 1,4-bis(2-isocyanatopropan-2-yl)benzene (tetramethylxylylene diisocyanate, TMXDI), 1,3-bis(isocyanatomethyl)-4-methylbenzene, 1,3-bis(isocyanatomethyl)-4-ethylbenzene, 1,3-bis(isocyanatomethyl)-5-methylbenzene, 1,3-bis(isocyanatomethyl)-4,5-dimethylbenzene, 1,4-bis(isocyanatomethyl)-2,5-dimethylbenzene, 1,4-bis (isocyanatomethyl)-2,3,5,6-tetramethylbenzene, 1,3-bis(isocyanatomethyl)-5-tert-butylbenzene, 1,3-bis(isocyanatomethyl)-4-chlorobenzene, 1,3-bis(isocyanatomethyl)-4,5-dichlorobenzene, 1,3-bis(isocyanatomethyl)-2,4,5,6-tetrachlorobenzene, 1,4-bis(isocyanatomethyl)-2,3,5,6-tetrachlorobenzene, 1,4-bis(isocyanatomethyl)-2,3,5,6-tetrabromobenzene, 1,4-bis(2-isocyanatoethyl)benzene and 1,4-bis(isocyanatomethyl)naphthalene, 1,2-, 1,3-, and 1,4-diisocyanatobenzene (phenylene diisocyanate), 2,4- and 2,6-diisocyanatotoluene (tolylene diisocyanate, TDI), 2,3,5,6-tetramethyl-1,4-diisocyanatobenzene, the isomeric diethylphenylene diisocyanates, diisopropylphenylene diisocyanates, diisododecylphenylene diisocyanates, and biphenyl diisocyanates, 3,3'-dimethoxybiphenyl 4,4'-diisocyanate, 2,2'-, 2,4'- and 4,4'-diisocyanatodiphenylmethane (MDI), 3,3'-dimethyldiphenylmethane 4,4'-diisocyanate, 4,4'-diisocyanatodiphenylethane, 1,5-diisocyanatonaphthalene (naphthylene diisocyanate, NDI), diphenyl ether diisocyanate, ethylene glycol diphenyl ether diisocyanate, diethylene glycol diphenyl ether diisocyanate, 1,3-propylene glycol diphenyl ether diisocyanate, benzophenone diisocyanate, triisocyanatobenzene, 2,4,6-triisocyanatotoluene, trimethylbenzene triisocyanate, diphenylmethane 2,4,4'-triisocyanate, 3-methyldiphenylmethane 4,6,4'-triisocyanate, the isomeric naphthalene triisocyanates and methylnaphthalene diisocyanates, triphenylmethane triisocyanate, 2,4-diisocyanato-1-[(5-isocyanato-2-methylphenypmethyl]benzene or 4-methyl-diphenylmethane 3,5,2',4',6'-pentaisocyanate.

Further diisocyanates that are likewise suitable can additionally be found for example in Justus Liebigs Annalen der Chemie, volume 562 (1949) pp. 75-136.

An example of a particularly suitable triisocyanate is 4-isocyanatomethyloctane 1,8-diisocyanate (triisocyanatononane; TIN).

The polycarbodiimide resins may also be produced using mixtures of at least two such mono-, di-, and/or triisocyanates.

The polycarbodiimide resins are preferably produced using monomeric diisocyanates.

Particular preference is given to using PDI, HDI, IPDI, H12-MDI, TMXDI, TDI, and/or MDI.

In the production of the polycarbodiimide resins, hydroxy- and/or amino-functional compounds are optionally used as further structural components.

Suitable hydroxy-functional structural components are for example any simple aliphatic or cycloaliphatic monoalcohols, such as methanol, ethanol, n-propanol, isopropanol, n-butanol, isobutanol, secbutanol, the isomeric pentanols, hexanols, octanols, and nonanols, n-decanol, n-dodecanol, n-tetradecanol, n-hexadecanol, n-octadecanol, cyclohexanol, the isomeric methylcyclohexanols and hydroxymethylcyclohexane, ether alcohols such as 2-methoxyethanol, 2-ethoxyethanol, 2-propoxyethanol, 2-butoxyethanol, diethylene glycol monomethyl ether, diethylene glycol monoethyl ether, diethylene glycol monobutyl ether, 3-methoxy-1-butanol and glycerol 1,3-diethyl ether, ester alcohols, such as hydroxyethyl acetate, butyl glycolate, ethyl lactate, glycerol diacetate or those that can be obtained by reacting the recited monoalcohols with lactones, or ether alcohols such as can be obtained by reacting the recited monoalcohols with alkylene oxides, in particular ethylene oxide and/or propylene oxide.

Likewise suitable alcohols for the production of the polycarbodiimide resins are any at least difunctional polyols, in particular simple polyhydric alcohols having 2 to 14, preferably 4 to 10, carbon atoms, for example ethane-1,2- diol, propane-1,2-diol and -1,3-diol, the isomeric butane-diols, pentanediols, hexanediols, heptanediols and octane-diols, decane-1,10-diol, dodecane-1,12-diol, cyclohexane-1,2-diol and -1,4-diol, cyclohexane-1,4-dimethanol, 1,4-bis(2-hydroxyethoxy)benzene, 2,2-bis(4-hydroxyphenyl)propane (bisphenol A), 2,2-bis(4-hydroxycyclohexyl)propane (perhydrobisphenol), propane-1,2,3-triol, butane-1,2,4-triol, 1,1,1-trimethylolethane, hexane-1,2,6-triol, 1,1,1-trimethylolpropane (TMP), bis(2-hydroxyethyl)hydroquinone, 1,2,4- and 1,3,5-trihydroxycyclohexane, 1,3,5-tris(2-hydroxyethyl)isocyanurate, 3(4),8(9)-bis(hydroxymethyl)-tricyclo-[5.2.1.02,6]decane, di-trimethylolpropane, 2,2-bis(hydroxymethyl)propane-1,3-diol (pentaerythritol), 2,2,6,6-tetrakis(hydroxymethyl)-4-oxaheptane-1,7-diol (dipentaerythritol), mannitol or sorbitol, low-molecular-weight ether alcohols, for example diethylene glycol, triethylene glycol, tetraethylene glycol, dipropylene glycol or dibutylene glycol, or low-molecular-weight ester alcohols, for example neopentyl glycol hydroxypivalate.

Suitable alcohols for producing the polycarbodiimide resins are also the customary polymeric polyether polyols, polyester polyols, polycarbonate polyols, and/or polyacrylate polyols known from polyurethane chemistry, which typically have a number-average molecular weight of 200 to 22 000, preferably of 250 to 18 000, more preferably of 250 to 12 000. A broad overview of such polymeric polyols for the production of polycarbodiimide resins can be found for example in N. Adam et al.: "Polyurethanes", Ullmann's Encyclopedia of 10 Industrial Chemistry, Electronic Release, 7th ed., chap. 3.2-3.4, Wiley-VCH, Weinheim 2005.

Suitable amino-functional structural components for producing the polycarbodiimide resins are for example simple aliphatic and cycloaliphatic monoamines, for example methylamine, ethylamine, n-propylamine, isopropylamine, the isomeric butylamines, pentylamines, hexylamines, and octylamines, n-dodecylamine, n-tetradecylamine, n-hexadecylamine, n-octadecylamine, cyclohexylamine, the isomeric methylcyclohexylamines and also aminomethylcyclohexane, secondary monoamines such as dimethylamine, diethylamine, dipropylamine, diisopropylamine, dibutylamine, diisobutylamine, bis(2-ethylhexyl)amine, N-methyl- and N-ethylcyclohexylamine, and also dicyclohexylamine.

Suitable amines are also any aliphatic and cycloaliphatic amines having at least two primary and/or secondary amino groups, for example 1,2-diaminoethane, 1,2-diaminopropane, 1,3-diaminopropane, 1,4-diaminobutane, 1,2-diamino-2-methylpropane, 1,5-diaminopentane, 1,3-diamino-2,2-dimethylpropane, 1,6-diaminohexane, 1,5-diamino-2-methylpentane, 1,6-diamino-2,2,4-trimethylhexane, 1,6-diamino-2,4,4-trimethylhexane, 1,7-diaminoheptane, 1,8-diaminooctane, 2,5-diamino-2,5-dimethylhexane, 1,9-diaminononane, 2-methyl-1,8-diaminooctane, 1,10-diaminodecane, 1,11-diaminoundecane, 1,12-diaminododecane, 1,2-diaminocyclopentane, 1,2-diaminocyclohexane, 1-amino-3,3,5-trimethyl-5-aminomethylcyclohexane (isophoronediamine, IPDA), 3(4)-aminomethyl-1-methylcyclohexylamine, 1,3-diamino-2- and/or -4-methylcyclohexane, isopropyl-2,4- and/or 2,6-diaminocyclohexane, 1,3-bis(aminomethyl)cyclohexane, 1,8-p-diaminomenthane, bis(4-aminocyclohexyl)methane, bis(4-amino-3-methylcyclohexyl)methane, bis(4-amino-3,5-di-methylcyclohexyl)methane, bis(4-amino-2,3,5-trimethylcyclohexyl)methane, 1,1-bis(4-aminocyclohexyl)propane, 2,2-bis(4-aminocyclohexyl)propane, 1,1-bis(4-aminocyclohexyl)ethane, 1,1-bis(4-aminocyclohexyl)butane, 2,2-bis(4-aminocyclohexyl)butane, 1,1-bis(4-amino-3-methylcyclo-hexyl)ethane, 2,2-bis(4-amino-3-methylcyclohexyl)propane, 1,1-bis(4-amino-3,5-dimethylcyclohexyl)ethane, 2,2-bis(4-amino-3,5-dimethylcyclohexyl)propane, 2,2-bis(4-amino-3,5-dimethylcyclohexyl)butane, 2,4-diaminodicyclohexylmethane, 4-aminocyclohexyl-4-amino-3-methylcyclohexylmethane, 4-amino-3,5-dimethylcyclohexyl-4-amino-3-methylcyclohexylmethane, and 2-(4-aminocyclohexyl)-2-(4-amino-3-methylcyclohexyl)methane, m-xylylenediamine, methyliminobispropylamine, iminobis-propylamine, bis(6-aminohexyl)amine, N,N-bis(3-amino-propyl)ethylenediamine, 4-aminomethyl-1,8-octanedi-amine, bis(aminopropyl)piperazine, aminoethylpiperazine, diethylenetriamine, dipropylenetriamine, triethylenete-tramine, tetraethylenepentamine, pentaethylenehexamine, heptaethyleneoctamine.

Suitable amines are also amino-functional polyalkylene glycols, for example 1,2-bis(aminoethoxy)ethane, 1,11-di-amino-3,6,9-trioxaundecane, 1,13-diamino-4,7,10-trioxatri-decane, and in particular the amine-functionalized polyal-kylene glycols having average molecular weights up to 5000, preferably up to 2000, more preferably up to 1000, marketed commercially by Huntsman Corp. under the trade name Jeffamine®.

Sterically hindered aliphatic diamines having two second-ary amino groups may optionally also be used for the production of the polycarbodiimide resins, for example the reaction products of aliphatic and/or cycloaliphatic diamines with maleic or fumaric esters known from EP-A 0 403 921, the bisadduct of acrylonitrile with isophoronediamine obtainable according to the teaching of EP-A 1 767 559 or the hydrogenation products Schiff bases obtainable from aliphatic and/or cycloaliphatic diamines and ketones, for example diisopropyl ketone, as described for example in DE-A 19 701 835.

Finally, suitable as structural components for the production of the polycarbodiimide resins are also amino alcohols, for example 2-aminoethanol, the isomeric aminopropanols and butanols, 3-aminopropane-1,2-diol, and 1,3-diamino-2-propanol.

The polycarbodiimide resins are produced by reacting organic isocyanates, optionally with hydroxy- and/or amino-functional compounds, by methods known per se in the presence of a suitable car-bodiimidization catalyst and with elimination of carbon dioxide.

Suitable catalysts for carbodiimide formation are described in a number of overview articles, for example in Houben-Weyl, Methoden der organischen Chemie [Methods of Organic Chemistry], volume E4, Kohlensäurederivate [Carbonic acid derivatives], Georg-Thieme-Verlag, Stuttgart, 1983, pp. 897 to 900 and 910, in Chemical Reviews, volume 67, number 2, 1967, pp. 107-113, in Angew. Chem., 1962, 74, 801-806, and in Angew. Chem. 1981, 93, 855-866. Further suitable catalysts can also be found in the patent literature, for example in DE 1130594, DE 3512918, U.S. Pat. Nos. 2,840,589, 2,853,473, 2,853,518 or 2,941,966.

Particularly suitable catalysts are, in particular, heterocyclic, phosphorus-containing compounds such as phospholines, phospholenes, and phospholidines and also the oxides and sulfides thereof. Examples of such catalysts include 1-methyl-2-phospholene-1-oxide, 1-methyl-3-phospholene-1-oxide, 3-methyl-1-phenyl-3-phospholene-1-oxide, and 3-methyl-1-phenyl-2-phospholene-1-oxide and also the phospholane analogs.

The synthesis of the carbodiimides is generally carried out in a manner known per se, for example by a process described in the abovementioned prior art, starting from isocyanates by catalysis with elimination of carbon dioxide. With a suitable selection of mono- and/or polyfunctional isocyanates, this affords solid mono- or polycarbodiimides having softening temperatures in the above range, which are preferably free of isocyanate groups and, when hydroxy- and/or amino-functional structural components are additionally used, have urethane and/or urea groups. Suitable aqueous polymer dispersions are those having nucleophilic functional groups. Such functional groups are carboxyl, amino, mercapto, and hydroxyl groups, with very particular preference given to the use of carboxyl groups, since they usually react with the carbodiimides without the use of catalysts. The minimum film-forming temperature of the dispersion polymers is ≤+23° C. They have a glass transition temperature measured by DSC (heating rate 20 K/min) of ≤0° C.

Suitable polymer dispersions are for example those based on polymers of olefinically unsaturated monomers, such as those described in EP-A 0 206 059. These are, for example, homopolymers and copolymers based on vinyl esters of carboxylic acids having 2 to 18 carbon atoms, preferably having 2 to 4 carbon atoms, such as vinyl acetate. These may optionally be used with up to 70% by weight, based on the total amount, of other olefinically unsaturated monomers and/or homopolymers or copolymers of (meth)acrylic esters of alcohols having 1 to 18 carbon atoms, preferably 1 to 4 carbon atoms, for example methyl, ethyl, propyl, hydroxyethyl or hydroxypropyl (meth)acrylate.

Preferred polymer dispersions are dispersions of polyurethane-polyurea polymers having lateral and/or terminal carboxyl groups in the polymer chain Polyurethane-polyurea dispersions are available on an industrial scale and are generally referred to as polyurethane dispersions (PUDs).

The polymers contain as structural components:
(A) at least one diol and/or polyol component
(B) at least one di- and/or polyisocyanate component
(C) at least one component having at least one hydrophilizing group
(D) optionally mono-, di- and/or triaminofunctional and/or hydroxyaminofunctional compounds, and
(E) optionally other isocyanate-reactive compounds.

Suitable diol and/or polyol components A) are compounds having at least two isocyanate-reactive hydrogen atoms and an average molecular weight preferably from 62 to 18 000, more preferably from 62 to 4000, g/mol. Examples of suitable structural components are polyethers, polyesters, polycarbonates, polylactones, and polyamides. Preferred polyols A) preferably have 2 to 4, particularly preferably 2 to 3, hydroxyl groups, very particularly preferably 2 hydroxyl groups. Mixtures of various such compounds are also possible.

Suitable polyester polyols are in particular linear polyester diols or also sparsely branched polyester polyols, as can be produced in a known manner from aliphatic, cycloaliphatic or aromatic di- or polycarboxylic acids such as succinic acid, methylsuccinic acid, glutaric acid, adipic acid, pimelic acid, suberic acid, azelaic acid, sebacic acid, nonanedicarboxylic acid, decanedicarboxylic acid, terephthalic acid, isophthalic acid, o-phthalic acid, tetrahydrophthalic acid, hexahydrophthalic acid, cyclohexanedicarboxylic acid, maleic acid, fumaric acid, malonic acid or trimellitic acid and acid anhydrides such as o-phthalic, trimellitic or succinic anhydride or mixtures thereof with polyhydric alcohols, such as ethanediol, di-, tri-, tetraethylene glycol, propane-1,2-diol, di-, tri-, tetrapropylene glycol, propane-1,3-diol, butane-1,4-diol, butane-1,3-diol, butane- 2,3-diol, pentane-1,5-diol, hexane-1,6-diol, 2,2-dimethylpropane-1,3-diol, 1,4-dihydroxycyclohexane, 1,4-dimethylolcyclohexane, octane-1,8-diol, decane-1,10-diol, dodecane-1,12-diol or mixtures thereof, optionally with the additional use of higher-functional polyols such as trimethylolpropane, glycerol or pentaerythritol. Cycloaliphatic and/or aromatic di- and polyhydroxyl compounds are of course also suitable as polyhydric alcohols for producing the polyester polyols. Instead of the free polycarboxylic acid, the corresponding polycarboxylic anhydrides or corresponding polycarboxylic esters of lower alcohols or mixtures thereof may also be used to produce the polyesters.

The polyester polyols may also be homopolymers or copolymers of lactones, which are obtained preferably through the addition of lactones or lactone mixtures, such as butyrolactone, ε-caprolactone, and/or methyl-ε-caprolactone, to the suitable difunctional and/or higher-functional starter molecules, such as the low-molecular-weight, polyhydric alcohols mentioned above as structural components for polyester polyols. Preference is given to the corresponding polymers of ε-caprolactone.

Polycarbonates having hydroxyl groups are also suitable as polyhydroxyl components A), for example those that can be produced by reacting diols, for example butane-1,4-diol and/or hexane-1,6-diol, with diaryl carbonates such as diphenyl carbonate, dialkyl carbonates such as dimethyl carbonate, or phosgene. The at least partial use of polycarbonates having hydroxyl groups can improve the resistance to hydrolysis of the polyurethane or polyurethane-urea dispersions.

Examples of suitable polyether polyols are the polyaddition products of styrene oxides, of ethylene oxide, propylene oxide, tetrahydrofuran, butylene oxide, epichlorohydrin, and mixed addition and grafting products thereof, and also the polyether polyols obtained by condensation of polyhydric alcohols or mixtures of the same and obtained by alkoxylation of polyhydric alcohols, amines, and amino alcohols. Polyether polyols suitable as structural components A) are homopolymers, copolymers, and graft polymers of propylene oxide and of ethylene oxide that are accessible by addition of the epoxides mentioned to low-molecular-weight diols or triols, such as those mentioned above as structural components for polyester polyols, or to higher-functional low-molecular-weight polyols such as pentaerythritol or sugar, or to water. Also suitable components A) are low-molecular-weight diols, triols, and/or tetraols such as ethanediol, di-, tri-, tetraethylene glycol, propane-1,2-diol, di-, tri-, tetrapropylene glycol, propane-1,3-diol, butane-1,4-diol, butane-1,3-diol, butane-2,3-diol, pentane-1,5-diol, hexane-1,6-diol, 2,2-dimethylpropane-1,3-diol, 1,4-dihydroxycyclohexane, 1,4-dimethylolcyclohexane, octane-1,8-diol, decane-1,10-diol, dodecane-1,12-diol, neopentyl glycol, cyclohexane-1,4-diol, cyclohexane-1,4-dimethanol, 1,4-, 1,3-, 1,2-dihydroxybenzene or 2,2-bis(4-hydroxyphenyl)propane (bisphenol A), TCD diol, trimethylolpropane, glycerol, pentaerythritol, dipentaerythritol or mixtures thereof, optionally with the additional use of other diols or triols not mentioned.

Polyols used may also be reaction products of the recited polyols, in particular of low-molecular-weight polyols, with ethylene oxide and/or propylene oxide.

The low-molecular-weight components A) have a molecular weight preferably from 62 to 400 g/mol and are preferably used in combination with the polyester polyols, polylactones, polyethers, and/or polycarbonates described above.

The polyol component A) is present in the polyurethane according to the invention preferably in an amount from 20% to 95%, particularly preferably from 30% to 90%, and very particularly preferably from 65% to 90%, by weight.

Suitable as components B) are any organic compounds having at least two free isocyanate groups per molecule. Preference is given to using diisocyanates Y(NCO)$_2$, where Y is a divalent aliphatic hydrocarbon radical having 4 to 12 carbon atoms, a divalent cycloaliphatic hydrocarbon radical having 6 to 15 carbon atoms, a divalent aromatic hydrocarbon radical having 6 to 15 carbon atoms or a divalent araliphatic hydrocarbon radical having 7 to 15 carbon atoms. Examples of such diisocyanates to be used with preference are tetramethylene diisocyanate, methylpentamethylene diisocyanate, hexamethylene diisocyanate, dodecamethylene diisocyanate, 1,4-diisocyanatocyclohexane, 1-isocyanato-3,3,5-trimethyl-5-isocyanatomethylcyclohexane (isophorone diisocyanate; IPDI), 4,4'-diisocyanatodicyclohexylmethane, 4,4'-diisocyanato-2,2-dicyclohexylpropane, 1,4-diisocyanatobenzene, 2,4-diisocyanatotoluene, 2,6-diisocyanatotoluene, 4,4'-diisocyanatodiphenylmethane, 2,2'- and 2,4'-diisocyanatodiphenylmethane, tetramethylxylylene diisocyanate, p-xylylene diisocyanate, p-isopropylidene diisocyanate, and mixtures consisting of these compounds.

In addition to these simple diisocyanates, polyisocyanates containing heteroatoms in the radical linking the isocyanate groups and/or having a functionality of more than 2 isocyanate groups per molecule are also suitable. The former are polyisocyanates having a uretdione, isocyanurate, urethane, allophanate, biuret, carbodiimide, iminooxadiazinedione, and/or oxadiazinetrione structure that are prepared for example by modification of simple aliphatic, cycloaliphatic, araliphatic and/or aromatic diisocyanates and formed from at least two diisocyanates. An example of an unmodified polyisocyanate having more than 2 isocyanate groups per molecule is e.g. 4-isocyanatomethyloctane 1,8-diisocyanate (nonane triisocyanate).

Preferred diisocyanates B) are hexamethylene diisocyanate (HDI), dodecamethylene diisocyanate, 1,4-diisocyanatocyclohexane, 1-isocyanato-3,3,5-trimethyl-5-isocyanatomethylcyclohexane (IPDI), 4,4'-diisocyanatodicyclohexylmethane, 2,4-diisocyanatotoluene, 2,6-diisocyanatotoluene, 4,4'-diisocyanatodiphenylmethane, 2,2'- and 2,4'-diisocyanatodiphenylmethane, and also mixtures consisting of these compounds.

Particularly preferred components B) are 2,4-diisocyanatotoluene, 2,6-diisocyanatotoluene, hexamethylene diisocyanate, and 1-isocyanato-3,3,5-trimethyl-5-isocyanatomethylcyclohexane, and also mixtures consisting of these compounds.

Component B) is present in the polyurethane according to the invention in amounts of 5% to 60%, preferably of 6% to 45%, and particularly preferably in amounts of 7% to 25%, by weight.

Suitable components C) are for example components containing sulfonate or carboxylate groups, such as diamino compounds and dihydroxy compounds additionally bearing sulfonate and/or carboxylate groups, for example the sodium, lithium, potassium, tert-amine salts of N-(2-aminoethyl)-2-aminoethanesulfonic acid, N-(3-aminopropyl)-2-aminoethanesulfonic acid, N-(3-aminopropyl)-3-aminopropanesulfonic acid, N-(2-aminoethyl)-3-aminopropanesulfonic acid, the analogous carboxylic acids, dimethylolpropionic acid, dimethylolbutyric acid, the reaction products in the sense of a Michael addition of 1 mol of diamine such as ethane-1,2-diamine or isophoronediamine with 2 mol of acrylic acid or maleic acid.

The acids are commonly used directly in the form of their sulfonate or carboxylate salt. However, it is also possible for some or all of the neutralizing agents necessary for salt formation not to be added until during or after production of the polyurethanes.

Examples of particularly suitable and preferred tert-amines for salt formation are triethylamine, dimethylcyclohexylamine, and ethyldiisopropylamine Other amines may also be used for salt formation, for example ammonia, diethanolamine, triethanolamine, dimethylethanolamine, methyldiethanolamine, aminomethylpropanol and also mixtures of the recited amines and also other amines. It is advisable not to add these amines until after the prepolymer has formed.

It is also possible to use for neutralization purposes other neutralizing agents such as sodium, potassium, lithium, and calcium hydroxides.

Further suitable components C) are nonionically hydrophilizing, mono- or difunctional polyethers based on ethylene oxide polymers or ethylene oxide/propylene oxide copolymers started on alcohols or amines, for example polyether LB 25 (Covestro Deutschland AG, Leverkusen, Germany) or MPEG 750: methoxypolyethylene glycol, molecular weight 750 g/mol (e.g. Pluriol 750, BASF AG, Germany).

Preferred components C) are N-(2-aminoethyl)-2-aminoethanesulfonate, N-(2-aminoethyl)-2-aminoethanecarboxylate, and the salts of dimethylolpropionic acid and dimethylolbutyric acid.

Component C) is present in the polyurethane according to the invention in a content preferably of 0.1% to 15% by weight, particularly preferably of 0.5% to 10% by weight, very particularly preferably of 0.8% to 5% by weight, and even more preferably of 0.9% to 3.0%, by weight.

Suitable components D) are mono-, di-, trifunctional amines and/or mono-, di-, trifunctional hydroxyamines, for example aliphatic and/or alicyclic primary and/or secondary monoamines such as ethylamine, diethylamine, the isomeric propyl- and butylamines, higher linear aliphatic monoamines and cycloaliphatic monoamines such as cyclohexylamine Further examples are amino alcohols, i.e. compounds containing amino and hydroxyl groups in the same molecule, for example ethanolamine, N-methylethanolamine, diethanolamine, diisopropanolamine, 1,3-diamino-2-propanol, N-(2-hydroxyethyl)ethylenediamine, N,N-bis(2-hydroxyethyl)ethylenediamine, and 2-propanolamine. Further examples are diamines and triamines, such as ethane-1,2-diamine, hexamethylene-1,6-diamine, 1-amino-3,3,5-trimethyl-5-aminomethylcyclohexane (isophoronediamine), piperazine, 1,4-diaminocyclohexane, bis(4-aminocyclohexyl)methane, and diethylenetriamine. Adipic dihydrazide, hydrazine, and hydrazine hydrate are additionally suitable. It is of course also possible to use mixtures of a plurality of the compounds D) mentioned, optionally also together with compounds D) that are not mentioned.

Preferred components D) are ethane-1,2-diamine, 1-amino-3,3,5-trimethyl-5-aminomethyl-cyclohexane, diethylenetriamine, diethanolamine, ethanolamine, N-(2-hydroxyethyl)ethylenediamine, and N,N-bis(2-hydroxyethyl)ethylenediamine.

Components D) serve as di- or trifunctional chain extenders, preferably in order to build up higher molecular weights, or in the form of monofunctional compounds to limit molecular weights, and/or optionally as a means of incorporating additional reactive groups such as free hydroxyl groups. If (poly)amines (D) are not used, the polymers formed are pure polyurethanes (which do not contain any urea groups).

Component D) is present in the polyurethane according to the invention in amounts preferably of 0% to 10%, particularly preferably of 0% to 5%, and very particularly preferably in amounts of 0.2% to 3%, by weight.

Components E) to be optionally used may be for example aliphatic, cycloaliphatic or aromatic monoalcohols having 2 to 22 carbon atoms, such as ethanol, butanol, hexanol, cyclohexanol, isobutanol, benzyl alcohol, stearyl alcohol, 2-ethylethanol and blocking agents customarily used for isocyanate groups that can be cleaved off again at elevated temperatures, for example butanone oxime, dimethylpyrazole, caprolactam, malonic ester, triazole, dimethyltriazole, tert-butylbenzylamine, cyclopentanone carboxyethyl ester.

Components E) may be present in the polyurethane according to the invention in amounts preferably of 0% to 20%, more preferably of 0% to 10%, by weight.

The additional use of component E) can result for example in polyurethane dispersions according to the invention containing other reactive groups in addition to the reactive carboxyl groups, which enables for example the use of different crosslinking mechanisms (dual cure) to achieve specific properties, for example a two-step curing process, optionally with a time interval between the steps, or a particularly high crosslinking density.

The lateral and/or terminal carboxyl groups can in principle be incorporated into the polymer skeleton via any of the structural components A) to E). They are preferably incorporated via components C), D), and E).

Incorporation via component C) can be accomplished for example by using dimethylolpropionic acid or dimethylolbutyric acid in the absence of neutralizing agent or with neutralizing agent added in a substoichiometric amount.

Compounds suitable for the incorporation of carboxyl groups as components D) are for example ones that contain only one isocyanate-reactive amino group and thus in the production of the polyurethanes according to the invention result in terminal carboxyl groups through reaction with the isocyanate component. Linear aliphatic, branched aliphatic, aliphatic-aromatic, and aromatic aminocarboxylic acids are suitable. Examples include aminocarboxylic acids having a primary or secondary amino group, such as alanine, 6-aminohexanoic acid, aminoundecanoic acid, 8-aminooctanoic acid, 5-aminopentanoic acid, 4-aminobutyric acid, aminobenzoic acid, 4-aminomethylcyclohexanecarboxylic acid, 2-aminohexanoic acid, 4-aminocyclohexanoic acid, 12-aminododecanoic acid, 9-aminononacarboxylic acid.

Further compounds suitable for the incorporation of carboxyl groups as components D) are for example diaminocarboxylic acids, which have 2 isocyanate-reactive amino groups and thus in the production of the polyurethanes according to the invention give rise to lateral carboxyl groups through reaction with the isocyanate components. Examples are lysine, arginine, and histidine.

Compounds suitable for the incorporation of carboxyl groups as components E) are for example hydroxycarboxylic acids containing only one hydroxyl group, for example hydroxypivalic acid, hydroxyacetic acid, and 2-hydroxypropanoic acid.

Particularly preferred polymer dispersions are dispersions of semicrystalline or crystalline polymers having lateral and/or terminal carboxyl groups in the polymer chain A polymer is referred to as semicrystalline or crystalline when it exhibits a melting peak in DSC measurement in accordance with DIN 65467 at a heating rate of 20 K/min. The melting peak is caused by the melting of regular substructures in the polymer. The melting temperature of the polymers or polymer layers obtained from the formulations according to the invention is preferably within a range from 30° C. to 110° C., particularly preferably from 35° C. to 90° C., very particularly preferably from 42° C. to 60° C. The enthalpy of fusion of the polymer layers obtained from the formulations according to the invention is >5 J/g, preferably >15 J/g. The first heating is evaluated in order to also detect polymers that crystallize slowly.

While the teaching of the present invention can in principle be realized with any dispersed polyurethane polymer or polyurethane-urea polymer, according to the invention the semicrystalline or crystalline polymer preferably comprises as component A) one or more crystalline or semicrystalline difunctional polyester polyols. The production of crystalline or semicrystalline polyester polyols is known from the prior art.

Suitable as crystalline or semicrystalline polyester polyols A are in particular linear or else sparsely branched polyester polyols based on dicarboxylic acids and/or derivatives thereof, such as anhy-drides, esters or acid chlorides and preferably aliphatic linear polyols. Mixtures of dicarboxylic acids and/or derivatives thereof are also suitable. Suitable dicarboxylic acids are for example adipic acid As crystalline or semicrystalline difunctional polyester polyols, succinic acid, sebacic acid or dodecanedioic acid. Preference is given to succinic acid, adipic acid and sebacic acid and mixtures thereof, particular preference to succinic acid and adipic acid and mixtures thereof, and very particular preference to adipic acid. These are used in amounts of at least 90 mol %, preferably of 95 to 100 mol %, based on the total amount of all carboxylic acids.

The difunctional polyester polyols can be prepared for example by polycondensation of dicarboxylic acids with polyols. The polyols preferably have a molecular weight of 62 to 399 g/mol, consist of 2 to 12 carbon atoms, are preferably unbranched, difunctional, and preferably have primary OH groups.

Examples of polyols that may be used for the preparation of the polyester polyols include polyhydric alcohols, for example ethanediol, di-, tri-, or tetraethylene glycol, propane-1,2-diol, di-, tri-, or tetrapropylene glycol, propane-1,3-diol, butane-1,4-diol, butane-1,3-diol, butane-2,3-diol, pentane-1,5-diol, hexane-1,6-diol, 2,2-dimethylpropane-1,3-diol, 1,4-dihydroxycyclohexane, 1,4-dimethylolcyclohexane, octane-1,8-diol, decane-1,10-diol, dodecane-1,12-diol or mixtures thereof.

Preferred polyol components for the polyester polyols are ethane-1,2-diol, butane-1,4-diol and hexane-1,6-diol, particular preference being given to butane-1,4-diol and hexane-1,6-diol and very particular preference to butane-1,4-diol.

The aqueous polyurethane or polyurethane-urea dispersions according to the invention may be produced using all methods known from the prior art, such as emulsifier-shear force, acetone, prepolymer mixing, melt emulsification, ketimine, and solid-state spontaneous dispersion methods or methods derived therefrom. A summary of these methods can be found in Methoden der organischen Chemie [Methods of Organic Chemistry] (Houben-Weyl, Erweiterungs- and Folgebände zur 4. Auflage [Expansion and Supplementary Volumes for the 4th Edition], volume E20, H. Bartl and J. Falbe, Stuttgart, New York, Thieme 1987, pp. 1671-1682). Preference is given to the melt emulsification, prepolymer mixing, and acetone methods. Particular preference is given to the acetone method. The use and performance of the acetone method is state of the art and known to those skilled in the art, for example from EP-A 0 232 778.

The pulverulent polycarbodiimide may be stirred directly into the polymer dispersion with the aid of suitable stirrer units (dissolver, propeller stirrer, disk stirrer, speed mixer or the like). Direct stirring is optionally accomplished with the additional use of additives such as protective colloids, emulsifiers, thickeners, fillers, defoamers, dyes, and other auxiliaries customary for the production of dispersion adhesives.

It may be advantageous to produce the aqueous formulation of the polycarbodiimide powder separately. This is done by dispersing the pulverulent polycarbodiimide in an aqueous mixture of protective colloids, emulsifiers, thickeners, defoamers, optionally other additives, with the aid of suitable stirrer units (dissolver, propeller stirrer, disk stirrer, speed mixer or the like). If required, the aqueous formulation may then be stirred into the polymer dispersion by means of suitable stirring units (dissolver, propeller stirrer, disk stirrer, speed mixer or the like).

The amount of polycarbodiimide powder in the adhesive dispersion or in the dried adhesive layer, the adhesive film or the adhesive powder is determined by the concentration of the nucleophilic groups (carboxyl, amino, mercapto or OH groups) in the dispersion polymer. The molar ratio of nucleophilic groups to carbodiimide segments ($-N=C=N-$) in the solid polycarbodiimide is 1:10 to 1:5 and preferably 1:5 to 1:1 and particularly preferably 1:4 to 1:2.

The preparations according to the invention are used for the production of adhesive bonds. After or during the drying of the adhesive layer produced by application of the aqueous dispersion, the polymer is heated to a temperature>Tm (above the melting temperature) by briefly heating the adhesive polymer (by means of infrared radiation, in a heating channel or in a heated press) to the point that it liquefies sufficiently for it to flow readily onto the surfaces of the substrates to be bonded, i.e. is able to wet them.

The preparations according to the invention may also be furnished with ferromagnetic particles. This allows the adhesive polymer to also be heated by induction. Heating with microwaves is also possible.

Examples of typical substrates are textiles, polymer films, for example made of PVC, metallic substrates, also in the form of films, thermoplastics, for example polyamide (PA), acrylonitrile-butadiene-styrene (ABS), polycarbonate (PC) or blends of ABS and PC, polyester, polyolefinic substrates, optionally after suitable pretreatment or application of a primer to achieve the necessary surface energy, wood- or wood fiber-containing substrates such as plywood, medium-density fiberboard (MDF), decorative films such as those used in automobile interiors (PVC foam film, PU films or polyolefinic film with and without embossing).

The aqueous preparations according to the invention may be applied to flat or three-dimensional surfaces in any desired manner, for example by spray, knife, brush or roller application methods. Drying affords latently reactive (pre) coatings.

If (partially) crystalline polyurethane dispersions are used, the formulations may also be applied to release paper (e.g. silicone paper or polyolefinic nonstick paper or similar carrier materials) by spray, knife, brush or roller application methods. Drying affords self-supporting, latently reactive films or nonwoven webs that, optionally after inserting a release paper, can be rolled up and stored as an adhesive film until use.

The solids in granule or powder form may be obtained from the preparations according to the invention comprising (partially) crystalline polyurethane dispersion polymers by suitable industrial processes.

For example, the formulations according to the invention may be freed of water by spray drying. This affords latently reactive powders that may optionally be ground to small particle sizes by a subsequent grinding process.

Latently reactive powders can also be obtained by coagulation of polymer dispersions with solid carbodiimide particles. Mixtures of e.g. anionically stabilized polymer dispersions and solid polycarbodiimide are dispersed into a salt solution containing polyvalent cations (for example $Ca^{2+}$, $Mg^{2+}$, $Al^{3+}$) by means of a rotor-stator mixer (for example from Kotthoff). On contact of the anionic groups on the surface of the polymer particles with the polyvalent cations, the polymer particles immediately coagulate, with the polycarbodiimide particles included in the coagulate. The coagulate is largely freed of water by filtration, centrifugation, etc. and then dried at temperatures below the reaction temperature of the polycarbodiimide or of the melting temperature of the dispersion polymer. After drying, the coagulate may optionally be ground to the requisite particle sizes in a grinding process, for example in ball mills, bead mills, sand mills or jet mills.

Another option for producing latently reactive powders is to freeze the mixture of polymer and polycarbodiimide out of the aqueous preparations at temperatures below 0° C. The precipitated polymer/polycarbodiimide mixture is then largely freed of water by filtration, centrifugation, etc. and finally dried. The coarse-grained powder obtained may then be ground to the requisite particle sizes by suitable grinding—it may be necessary for the grinding process to take place at low temperatures (i.e. well below the glass temperature)—for example in ball mills, bead mills, sand mills or jet mills.

The drying of the latently reactive coatings, films, nonwoven webs or powders must take place at temperatures below the softening temperature of the polymer or the softening temperature (Tg or Tm) of the polycarbodiimide Whichever is the lowest of the softening temperature and melting temperature should be used. If one of the temperatures mentioned were to be exceeded, this would inevitably result in (premature and therefore undesirable) crosslinking of the polymer. The largely dry, latently reactive coatings, films or powders may still have a residual moisture content of 0.1-5%.

The latently reactive adhesive dispersions, latently reactive adhesive layers, self-supporting latently reactive adhesive films or latently reactive adhesive powders according to the invention are used for bonding a wide variety of substrate combinations:

The aqueous formulation according to the invention may be applied to a substrate, for example by spray, knife or roller application and dried (if necessary at elevated temperature). This affords a substrate furnished with latently reactive adhesive polymer.

The latently reactive adhesive film may be laminated onto a film web by application of pressure and at a temperature below the reaction temperature of the reactive adhesive polymer (for example a calender). This affords a substrate furnished with latently reactive adhesive polymer.

The adhesive powder may be sprinkled onto a substrate, for example film web, textile, leather, etc., and sintered onto the substrate by heating the adhesive powder (for example with an infrared radiator, with heated air, or a heating channel) This affords a substrate furnished with the reactive adhesive powder.

The joining process may be executed with the adhesive polymer applied on one side (i.e. the adhesive polymer is present on only one surface of the substrates provided for the joining process) or with the adhesive polymer applied on both sides (i.e. the adhesive polymer is present on both surfaces of the substrates provided for the joining process). The optimal procedure in the individual case (one-sided or two-sided application) depends inter alia on the wetting behavior of the substrate surfaces during thermal activation with the thermoplastically softened adhesive layer and can readily be determined by those skilled in the art of this technical field as part of their routine activities.

For the joining process, the latently reactive adhesive polymer must be heated at least to the point that it liquefies sufficiently that a) it is able to readily wet the adhesive-free substrate surface (and be able to flow readily onto the substrate surface), and/or b) the polymer chains of the adhesive polymer and become flowable such that they flow into one another (when adhesive has been applied on both sides). The heating of the adhesive polymer is accompanied by the initiation of the crosslinking reaction. The chosen joining conditions (pressure, temperature, and duration) must be sufficient to achieve both good wetting of the substrate surfaces and adequate initiation of the crosslinking reaction.

The heating of the adhesive polymer can take place immediately before the joining process by means of IR radiation, in a heating channel, by microwaves, by blowing with hot air or in an induction field. The joining process is then accomplished for example by deep-drawing the substrate with the heated adhesive layer onto the second substrate.

Another option is press lamination. In this process, the substrates to be bonded are placed in a heated press and pressed under the action of pressure and temperature. Alternatively, the latently reactive adhesive film can, during press lamination, also be separately inserted between the substrates to be bonded.

Methods/Definitions:

Particle Size:

The determination of particle size is carried out in accordance with ISO 13320 (laser diffraction). Five individual measurements are performed and the arithmetic mean of the individual measurements is reported. Instrument: Malvern Mastersizer 3000.

Determination of the Carbodiimide Concentration:

The carbodiimide concentration, i.e. the concentration of the —N=C=N segments in the polycarbodiimide resin, is determined by ATR infrared spectroscopy (Perkin Elmer Spectrum two).

Firstly, solutions of dicyclohexylcarbodiimide (DCC) in ethanol were prepared (concentrations: 0.1 mmol/g, 0.2 mmol/g, 0.5 mmol/g, 1.0 mmol/g, 1.5 mmol/g, and 2 mmol/g). The IR spectra of these solutions were recorded. The peak areas ($P_A$) of the carbodiimide band at approx. 2118 $cm^{-1}$ were determined. The data (concentration c of the DCC solutions and measured $P_A$ values) were used to generate a calibration line:

$P_A$=m·c [meq DCC/g], where m is the slope of the calibration lines.

For the determination of the carbodiimide concentration of the polycarbodiimide powders, a 25% by weight solution of the powder in xylene was prepared. The peak area ($P_A$) of the carbodiimide band of the solution at approx. 2118 $cm^{-1}$ was determined. The concentration [meq DCC/g] is given by $P_A$×4/m.

For the determination of the carbodiimide concentration in the aqueous preparation (suspension), an aqueous preparation was dried at RT. The proportion of polycarbodiimide resin in the dried residue was calculated from the non-volatile components (=a [%]). 10 g of the dried residue was then dissolved in 20 g of xylene. The peak area of the xylene solution at approx. 2118 $cm^{-1}$ was then determined by ATR infrared spectroscopy. The carbodiimide concentration of the polycarbodiimide resin in the aqueous preparation [meq DCC/g] was given by $P_A$×3×100/(a×m).

The change in the carbodiimide concentration is reported as a percentage of the baseline value. Based on the measurement conditions, the reported values for the change in the carbodiimide concentration are assumed to be accurate to ±5 percentage points.

Glass Transition Temperature (Tg):

The glass transition characterizes the temperature range in which the transition of the compound from the brittle state to the viscoelastic state occurs. The glass transition temperature is determined by DSC (differential scanning calorimetry). The glass transition temperature (Tg) is the temperature at half height of the difference in specific heat capacity between the start and end of the glass transition (graphical evaluation, tangent intersection). The heating rate during the measurement is 20 K/min.

Melting Point (Tm):

The melting temperature is determined by DSC (differential scanning calorimetry). The melting temperature (Tm) is the temperature at which the melting peak in the DSC diagram reaches its maximum height. The heating rate during the measurement is 20 K/min.

Softening Temperature:

The softening temperature is synonymous with the glass transition temperature or the melting point of the compound.

Minimum Film-Forming Temperature (MFT):

The MFT is the lowest temperature at which an adhesive formulation or paint formulation is able to form a cohesive film. The MFT is determined in accordance with DIN ISO 2115 in the case of aqueous dispersions.

(Partially) Crystalline Polymer:

A polymer that contains both crystalline and amorphous regions (domains) is described as semicrystalline. The term plays a role essentially in the physics of polymers. One method for determining the crystallinity of a polymer is DSC. DSC can be used to determine the melting temperature (temperature at the maximum of the melting peak) and the heat of fusion (area of the melting peak).

Production of Adhesive Bonds:

5 cm×2 cm canvas strips are coated on one end with 1 cm×2 cm of adhesive dispersion (brush application approx. 100 g/m² wet). The adhesive layer is dry after 1 h. The adhesive-coated surfaces are laid on top of one another so that the joined test specimen can be tested in a lap shear test. The test specimens are then placed in a heated membrane press and pressed at 4 bar for 1 min or 5 min under the action of heat. The membrane press temperature is set such that the temperature in the bonded join reaches a value of 70° C., 80° C., 90° C., 100° C., 110° C., and 120° C. after 1 min or 5 min.

To assess the positional stability of the latently reactive layers or films, the canvas strips coated with adhesive dispersions were stored for 1 month and 2 months in standard climatic conditions (23° C., 50% relative humidity) before pressing.

19

20

Determination of the Softening Temperature Of The Adhesive Bond:

One week after the production of the test specimens, the softening temperature is determined in the lap shear test. The samples are suspended in a heating cabinet, loaded with a 4 kg weight and thermally equilibrated at 40° C. for 30 minutes. The heating cabinet is then heated at a linear heating rate of 0.5 K/min. The failure (the softening temperature) of the adhesive bond is automatically registered when the adhesive bond comes apart. The end temperature of the method is 150° C.

Oscillation Measurements (Temperature Sweep)

The polymer sample is placed in the measuring unit (plate-plate geometry having a diameter of 7.9 mm and a plate-to-plate distance of 0.65 mm) of the oscillating rheometer (Rheometrics ARES), which is thermally equilibrated at 25° C., and is subjected on one side to a sinusoidal shear stress $[\tau]$ having a frequency of 1 Hz and a deformation of 0.02. During the measurement, the temperature of the measuring unit is heated from 25° C. to 150° C. at a heating rate of 5 K/min. The measured torque, the phase shift between stress and strain, and the measurement geometry (1) are used to calculate the values for the storage modulus [G'] (elastic component) and the loss modulus [G"] (viscous component). The two moduli [G'] and [G"] allow qualitative assessment of the flow behavior of the polymer and thus permit conclusions to be drawn about the durability of an adhesive bond.

(1) M. Laun, D. Auhl, R. Brummer, D. J. Dijkstra, C. Gabriel, M. A. Mangnus, M. Ruellmann, W. Zoetelief, U. A. Handge, "Guidelines for checking performance and verifying accuracy of rotational rheometers: viscosity measurements in steady and oscillatory shear" *Pure Appl. Chem.* 2014 86(12) 1945-1968

The following relationship between G" and G' applies in principle to adhesive polymers at low frequencies and high temperatures:

| Adhesive polymer is flowable (wetting) | Gel point | Cross-linked adhesive polymer (resistance) |
|---|---|---|
| G" > G' | G" = G' | G" < G' |

EXAMPLES

The present invention is elucidated further by the examples that follow, without being restricted thereto.

Starting Materials:

Cycloaliphatic polyisocyanate H12MDI: 4,4'-Diisocyanatodicyclohexylmethane, CAS No. 79103-62-1 (Desmodur® W, Covestro Deutschland AG, Leverkusen, Germany)

Carbodiimidization catalyst: 3-Methyl-1-phenyl-2-phospholene-1-oxide; CAS No. 707-61-9 (Sigma-Aldrich Chemie GmbH, Munich, Germany)

Stabaxol® P: Aromatic polycarbodiimide in powder form. Stabaxol® P is used as a hydrolysis stabilizer for thermoplastic polyurethanes (TPU), polyesters (PET), polyamides (PA), etc. Stabaxol® P has a melting point between 60° C. and 90° C. The carbodiimide content is at least 12.5%. (from Lanxess AG, Köln, Germany)

Stabaxol® P100: Polycarbodiimide in powder form. Stabaxol® P is used as a hydrolysis stabilizer inter alia for polyesters (PET), polyamides (PA), etc. Stabaxol® P 100 has a melting point between 100° C. and 120° C.

The carbodiimide content is at least 13%. (from Lanxess AG, Köln, Germany)

BorchiGel® A LA: Thickener for aqueous polyacrylate-based coating systems. (Borchers GmbH, Berghausener Str. 100, 40764 Langenfeld, Germany)

BorchiGel® L75N: Polyurethane-based liquid thickener (Borchers GmbH, Berghausener Str. 100, 40764 Langenfeld, Germany)

Lucramul® 1820 liquid: Nonionic dispersant base: Fatty alcohol (C16-C18) ethoxylated (LEVACO Chemicals GmbH, Chempark Leverkusen, 51368 Leverkusen, Germany)

Disperbyk 191: VOC- and solvent-free wetting/dispersing additive for water-based paint systems and adhesives. Suitable for binder-free and binder-containing pigment concentrates. Specially optimized for emulsion systems. (BYK-Chemie GmbH 46483 Wesel)

BYK® 024: VOC-free silicone-containing defoamer for water-based dispersion paints, printing inks and overprint varnishes and also dispersion adhesives. (BYK-Chemie GmbH 46483 Wesel)

PUD 1: Dispercoll® U 2824 XP: Polyester diol-based polyurethane dispersion from Covestro Deutschland AG, 51365 Leverkusen; solids content approx. 40% by weight. The polymer contains approx. 18 mmol of COOH groups/100 g. The polymer has a glass transition temperature of approx. −40° C. The melting point of the crystalline segments in the polyurethane polymer chain is +47° C.

PUD 2: Dispercoll® U XP 2643: Polypropylene glycol-based polyurethane dispersion from Covestro Deutschland AG, 51365 Leverkusen; solids content approx. 40% by weight. The polymer contains approx. 18 mmol of COOH groups/100 g. The polymer has a glass transition temperature of approx. −50° C.

Formulations:

Example 1

Preparation of a Solid Polycarbodiimide

A 1 L flat-flange-jointed beaker is charged with 524 g of Desmodur® W, which is reacted with 129 g of dibutylamine over a 2 h period. 3.25 g of 3-methyl-1-phenyl-2-phospholene oxide is then added and the carbodiimidization reaction is initiated by heating the reaction mixture to 180° C. The reaction mixture is held at this temperature for 60 h. The polycarbodiimide resin is then poured onto a metal sheet, causing it to solidify.

The polycarbodiimide resin has a glass transition temperature of +35° C.

The solid polycarbodiimide (example 1) was ground to the appropriate particle size dv50<100 μm by grinding in a knife mill or a jet mill (Hosowaka-Alpine model 100 AFG).

| Example | dv10 | dv50 | dv90 | Carbodiimide content [meq DCC/g] |
|---|---|---|---|---|
| 1a | 15.0 | 65.8 | 186 | 3.0 |
| 1b | 6.3 | 20.8 | 50.9 | 3.0 |
| 1c | 1.1 | 3.4 | 7.7 | 3.3 | dv values in μm 2a and 2b are non-inventive comparative examples. These polycarbodiimide powders are used as hydrolysis stabilizers for polymers comprising polyester segments (polyesters, TPUs, etc.).

| | Example | dv10 | dv50 | dv90 | Carbodiimide content *[meq DCC/g] |
|---|---|---|---|---|---|
| 2a | Staboxol P 100 | 21.3 | 86.9 | 219 | 3.2 |
| 2b | Stabaxol P | 15.5 | 105 | 357 | 3.3 | dv values in μm

*For better comparability, the carbodiimide content [meq DCC/g] was calculated from the information in the data sheets.

$$meq\frac{DCC}{g} = \frac{CDI[\%]}{\frac{40\ g}{mol}}\frac{1000\ mmol/mol}{100}$$

Preparation of the Aqueous Formulation Comprising Polycarbodiimide Powder:

Example 3a and 3b: 100 g of polycarbodiimide powder 1a or 1b, 135 g of water, 10 g of Lucramul® 1820 liquid, and 2.6 g of BorchiGel® ALA are added to a beaker and mixed with a dissolver disk at 3000 rpm for 5 min. A pseudoplastic paste forms that can be stirred directly into the polymer dispersion.

Example 4: 100 g of polycarbodiimide lc, 142 g of water, 20 g of Disperbyk® 191, 1.4 g of BYK® 024, and 4 g of BorchiGel® L 75N are added to a beaker and mixed with a dissolver disk at 3000 rpm for 5 min. A viscous paste forms that can be stirred directly into the polymer dispersion.

Example 5 and 6: 100 g of polycarbodiimide example 2a or 2b, 136 g of water, 20 g of Disperbyk® 191, 1.4 g of BYK® 024, and 4 g of BorchiGel® L 75N are added to a beaker and mixed with a dissolver disk at 3000 rpm for 5 min. A viscous paste forms that can be stirred directly into the polymer dispersion.

| Polycarbodiimide powder | Aqueous formulation of polycarbodiimide powder |
|---|---|
| 1a | Example 3a |
| 1b | Example 3b |
| 1c | Example 4 |
| 2a | Example 5 |
| 2b | Example 6 |

Reactive Polymer Dispersion:

| | Polymer dispersion | | Aqueous formulation of polycarbodiimide | | | Molar ratio: meq |
|---|---|---|---|---|---|---|
| Example | PUD 1 | PUD 2 | 3a | 3b | 4 | DCC:—COOH |
| 7* | 100 | — | — | — | — | — |
| 8 | 100 | — | 7.4 | — | — | 1.4:1 |
| 9 | 100 | — | 15.1 | — | — | 2.5:1 |
| 10 | 100 | — | — | 14.8 | — | 2.5:1 |
| 11 | 100 | — | — | 29.6 | — | 5.0:1 |
| 12 | 100 | — | — | — | 10.8 | 2:1 |
| 13 | 100 | — | — | — | 21.6 | 4:1 |
| 14* | — | 100 | — | — | — | — |
| 16 | — | 100 | 7.4 | — | — | 1.4:1 |
| 17 | — | 100 | 15.1 | — | — | 2.5:1 |
| 18 | — | 100 | — | 14.8 | — | 2.5:1 |
| 19 | — | 100 | — | 29.6 | — | 5.0:1 |

-continued

| | Polymer dispersion | | Aqueous formulation of polycarbodiimide | | | Molar ratio: meq |
|---|---|---|---|---|---|---|
| Example | PUD 1 | PUD 2 | 3a | 3b | 4 | DCC:—COOH |
| 20 | — | 100 | — | — | 10.8 | 2:1 |
| 21 | — | 100 | — | — | 21.6 | 4:1 |

All quantities stated in g

Comparative examples with solid nolycarbodiimide for use as hydrolysis stabilizers

| | Polymer dispersion | Aqueous formulation polycarbodiimide | | Molar ratio: meq DCC:—COOH |
|---|---|---|---|---|
| Example | PUD 1 | 5 | 6 | |
| 22* | 100 | 22.9 | | 4:1 |
| 23* | 100 | | 22.9 | 4:1 |

All quantities stated in g

The examples marked with * are comparative examples

Results:

Oscillation Measurements:

The oscillation measurements are carried out on dried adhesive films. For this purpose, the dispersions example 7*, 10, 11, 14*, 18, and 19 were poured into Teflon dishes such that the adhesive polymers had a layer thickness of approx. 1 mm after drying. After storage for one week at 23° C. and 50% relative humidity, the film samples were investigated in an oscillation rheometer (ARES, TA-Instruments).

Softening Temperature of the Adhesive Bond:

| | Thermal activation 1 min at temperature | | | | | |
|---|---|---|---|---|---|---|
| Example | 70° C. | 80° C. | 90° C. | 100° C. | 110° C. | 120° C. |
| 7* | 33 | 33 | 33 | 33 | 33 | 33 |
| 8 | 33 | 37 | 32 | 33 | 29 | 37 |
| 9 | 40 | 37 | 39 | 36 | 35 | 40 |
| 10 | 37 | 34 | 42 | 37 | 43 | 46 |
| 11 | 43 | 41 | 40 | 45 | 52 | 65 |
| 12 | 53 | 53 | 53 | 56 | 55 | 55 |
| 13 | 54 | 52 | 53 | 59 | 58 | 57 |
| 14* | 26 | 26 | 26 | 26 | 26 | 26 |
| 16 | 26 | 24 | 38 | 32 | 29 | 32 |
| 17 | 29 | 28 | 42 | 38 | 37 | 48 |
| 18 | 50 | 56 | 67 | 76 | 86 | 115 |
| 19 | 71 | 82 | 84 | 113 | 107 | 96 |
| 20 | 50 | 64 | 72 | 101 | 103 | 118 |
| 21 | 59 | 48 | 105 | 116 | 121 | 124 |

All numerical values [° C.]

| | Thermal activation 5 min at temperature | | | | | |
|---|---|---|---|---|---|---|
| Example | 70° C. | 80° C. | 90° C. | 100° C. | 110° C. | 120° C. |
| 7* | 33 | 33 | 33 | 33 | 33 | 33 |
| 8 | 39 | 37 | 36 | 39 | 45 | 48 |
| 9 | 40 | 40 | 42 | 45 | 45 | 51 |
| 10 | 42 | 45 | 51 | 56 | 104 | 105 |
| 11 | 44 | 49 | 60 | 69 | 138 | 138 |
| 12 | 53 | 55 | 55 | 59 | 64 | 63 |
| 13 | 55 | 66 | 89 | 102 | 127 | 119 |
| 14* | 26 | 26 | 26 | 26 | 26 | 26 |
| 16 | 39 | 45 | 57 | 57 | 71 | 95 |
| 17 | 43 | 42 | 58 | 69 | 85 | 105 |
| 18 | 58 | 67 | 103 | 141 | 140 | 138 |
| 19 | 111 | 99 | 97 | 128 | 119 | 117 |

-continued

| | Thermal activation 5 min at temperature | | | | | |
|---|---|---|---|---|---|---|
| Example | 70° C. | 80° C. | 90° C. | 100° C. | 110° C. | 120° C. |
| 20 | 70 | 86 | 86 | 96 | 92 | 106 |
| 21 | 128 | 139 | 130 | 137 | 135 | 142 |

All numerical values [° C.]

The crosslinking effect of solid polycarbodiimide (examples 2a and 2b and also 3) in the adhesive layers—produced from the polyurethane dispersions PUD 1 and PUD 2—is clear. The softening temperatures of the adhesive bonds increase with rising temperature and with increasing duration of exposure to heat. The increase in the softening temperature is directly due to the polymer crosslinking and thus to the decrease in the flowability of the adhesive polymer at elevated temperature.

Storage of the adhesive-coated substrates for 1 month at 23° C./50% rel. humidity:

| | Thermal activation 5 min at temperature | | | | | |
|---|---|---|---|---|---|---|
| Example | 70° C. | 80° C. | 90° C. | 100° C. | 110° C. | 120° C. |
| 12 | 53 | 53 | 58 | 61 | 71 | 81 |
| 13 | 54 | 57 | 66 | 80 | 102 | 128 |
| 20 | 58 | 65 | 75 | 81 | 86 | 87 |
| 21 | 134 | 136 | 140 | 142 | 143 | 141 |

All numerical values [° C.]

Storage of the adhesive-coated substrates for 2 months at 23° C./50% rel. humidity:

| | Thermal activation 5 min at temperature | | | | | |
|---|---|---|---|---|---|---|
| Example | 70° C. | 80° C. | 90° C. | 100° C. | 110° C. | 120° C. |
| 12 | 53 | 54 | 57 | 62 | 67 | 86 |
| 13 | 54 | 59 | 68 | 79 | 99 | 131 |
| 20 | 38 | 56 | 76 | 77 | 80 | 85 |
| 21 | 87 | 128 | 137 | 128 | 135 | 131 |

All numerical values [° C.]

The stability of the reactive adhesive layer on the substrate is likewise clear. Even after storage of the coated substrates for 2 months, it is possible to produce adhesive bonds in which the softening temperatures are above the softening temperatures of the adhesive polymers without polycarbodiimide crosslinkers (comparative examples 7* and 14*).

Stability of the Polycarbodiimide Powders in Aqueous Formulation:

The aqueous polycarbodiimide subspersion example 3 was stored at 23° C. The carbodiimide concentration of the fresh polycarbodiimide suspension and of the polycarbodiimide suspension stored for 1 month or 2 months was determined after dissolving the dried polycarbodiimide resin in xylene.

| Age of the aqueous polycarbodiimide suspension | Example 3 |
|---|---|
| Fresh | 3.2 |
| 1 week | 3.3 |

-continued

| Age of the aqueous polycarbodiimide suspension | Example 3 |
|---|---|
| 1 month | 3.1 |
| 2 months | 3.0 |

All data in meq DCC/g polycarbodiimide powder.

The aqueous formulations of the solid polycarbodiimide (example 3) are adequately stable for at least 2 months.

FIG. 1 shows that the crosslinking of the polymer chains of the dispersion polymer from PUD 1 by the solid polycarbodiimide (example 3b) is clear:
i. Polymer from example 7 (without crosslinker) is G'<G" over the entire temperature range
ii. Polymer from example 10: G' increases from 94° C.; G'=G" at 120° C.
iii. Polymer from example 11: G' increases from 86° C.; G'=G" at 105° C.

Figure 2:
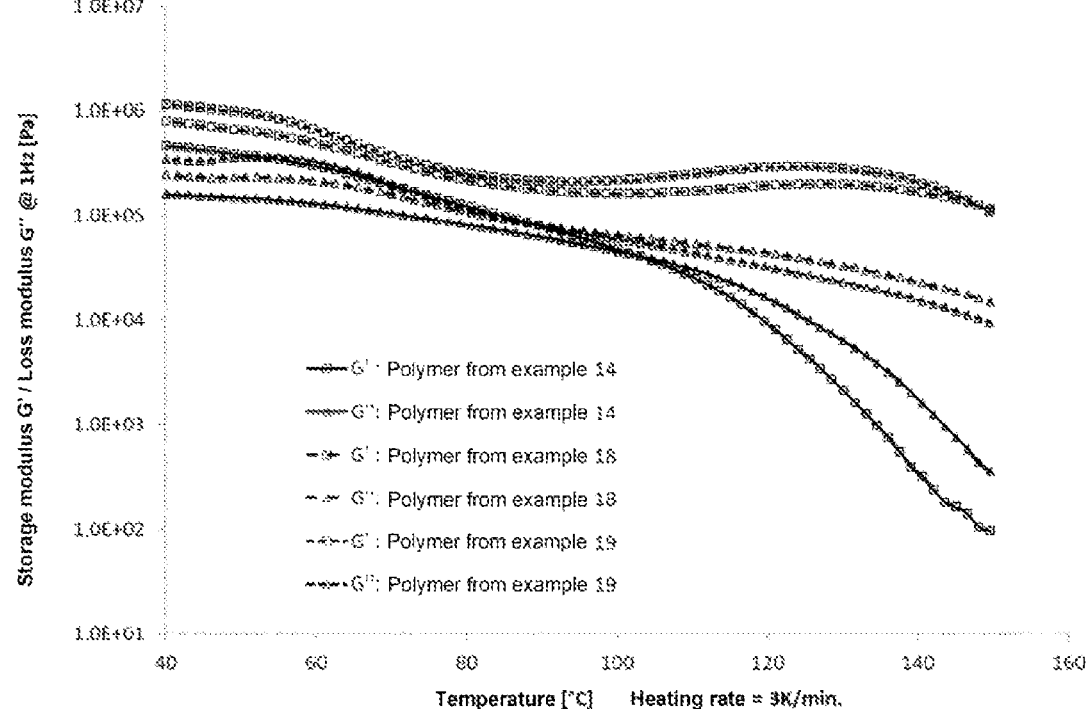
FIG. 2 is a graph showing the storage modulus and loss modulus over a temperature range for polymers described in examples 14, 18 and 19.

FIG. 2 shows that the crosslinking of the polymer chains of the dispersion polymer from PUD 2 by the solid polycarbodiimide (example 3b) is clear:
i. Polymer from example 14 (without crosslinker)=G'<G" at 100° C.
ii. Polymer from example 18: G'>G" over the entire temperature range. The separation between G' and G" increases with increasing temperature.
iii. Polymer from example 19: G'>G" over the entire temperature range. The separation between G' and G" increases with increasing temperature.

Figure 3:
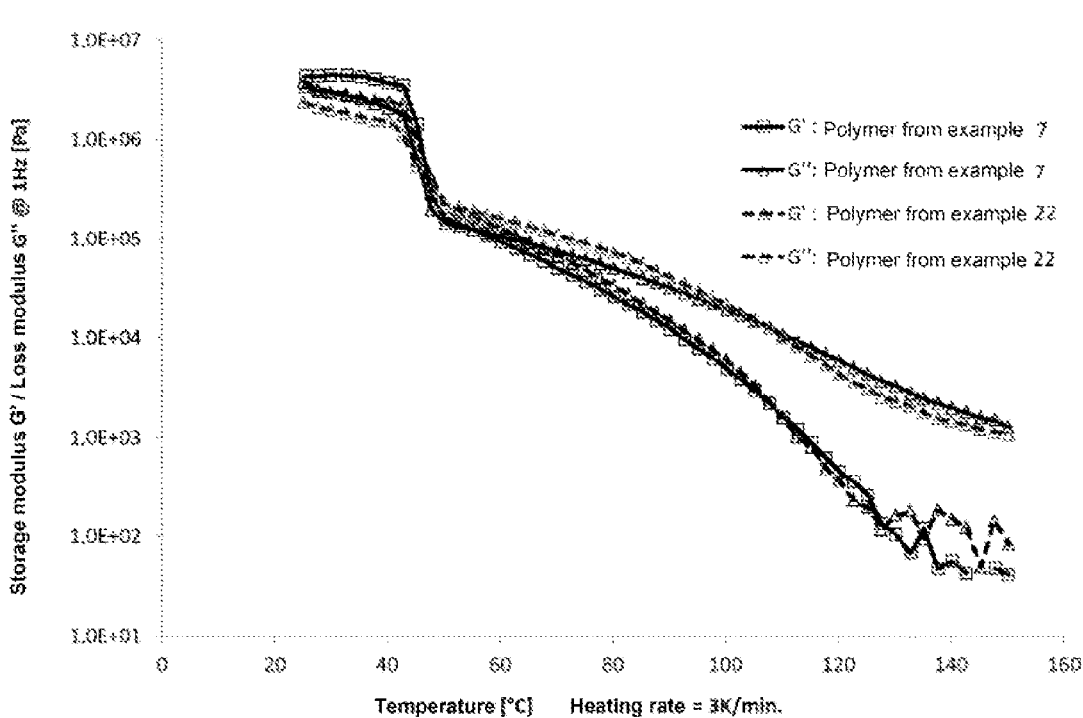
FIG. 3 is a graph showing the storage modulus and loss modulus over a temperature range for polymers described in examples 7 and 22.

FIG. 3 shows that the Staboxol® P 100 used as a hydrolysis stabilizer (example 2a) has no crosslinking effect at up to 160° C. The value for G' is below the value of G" over the entire temperature range.

Figure 4:
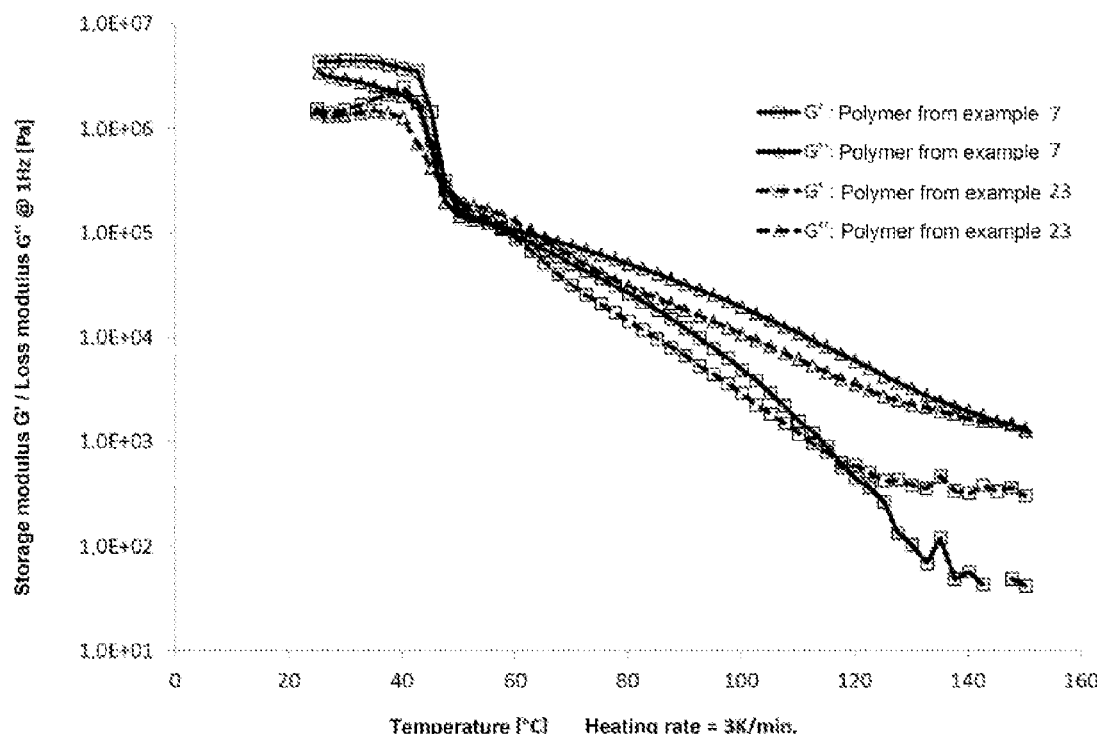
FIG. 4 is a graph showing the storage modulus and loss modulus over a temperature range for polymers described in examples 7 and 23.

FIG. 4 shows that the Staboxol P used as a hydrolysis stabilizer (example 2b) has no crosslinking effect at up to 160° C. The value for G' is below the value of G" over the entire temperature range.

The invention claimed is:

1. A latently reactive, dispersion polymer-based preparation having a minimum film-forming temperature of ≤+23° C. and a glass transition temperature measured by DSC (heating rate 20 K/min) of ≤0° C. that can be crosslinked with carbodiimides and that comprises at least one polycarbodiimide having a glass transition temperature of at least +30° C. and an average functionality of at least 2, wherein the dispersion polymer is a semicrystalline polyurethane polymer or polyurethane-polyurea polymer.

2. The preparation of claim 1, which is an aqueous dispersion.

3. The preparation of claim 1, which is a pulverulent mixture.

4. The preparation of claim 1, which is a film.

5. The preparation of claim 1, wherein the polycarbodiimide has aliphatically or cycloaliphatically attached carbodiimide groups.

6. The preparation of claim 1, wherein the polycarbodiimide has a particle size dv(50)≤70 μm.

7. The preparation of claim 6, wherein the polycarbodiimide has a particle size dv(50)≤20 μm.

8. The preparation of claim 7, wherein the polycarbodiimide has a particle size dv(50)≤3.4 μm.

9. The preparation of claim 1, wherein the dispersion polymer comprises polycarbonate segments in the polyol component (A).

10. A substrate coated with the preparation of claim 1.

11. A substrate coated with a latently reactive film obtained from the preparation of claim 1.

12. The substrate of claim 11, wherein the substrate is bonded by thermally induced curing of the latent-reactive film.

13. An adhesive comprising the latently reacative, dispersion polymer-based preparation of claim 1.

14. An adhesive comprising a latently reactive, dispersion polymer-based preparation having a minimum film-forming temperature of ≤+23° C. and a glass transition temperature measured by DSC (heating rate 20 K/min) of ≤0° C. that can be crosslinked with carbodiimides and that comprises at least one polycarbodiimide having a glass transition temperature of at least +30° C. and an average functionality of at least 2, wherein the adhesive is a storage-stable, self-supporting latently reactive adhesive film, or the adhesive is a storage-stable, self-supporting latently reactive adhesive powder.

\* \* \* \* \*